United States Patent [19]

Sugiyama et al.

[11] Patent Number: 4,692,816
[45] Date of Patent: Sep. 8, 1987

[54] DIGITAL DATA TRANSMITTING SYSTEM FOR TRANSMITTING DIGITAL DATA A NUMBER OF TIMES DEPENDING ON AN INFORMATION CONTENT OF THE DIGITAL DATA

[75] Inventors: Hiroyuki Sugiyama, Isehara; Nobuaki Takahashi, Yamato; Takeshi Shibamoto, Sagamihara; Kazunori Nishikawa, Machida; Makoto Komura, Tokyo, all of Japan

[73] Assignee: Victor Company of Japan Ltd., Yokohama, Japan

[21] Appl. No.: 626,700

[22] Filed: Jul. 2, 1984

[30] Foreign Application Priority Data

Jul. 8, 1983 [JP] Japan .................... 58-124217
Jul. 8, 1983 [JP] Japan .................... 58-124218

[51] Int. Cl.$^4$ .................. H04N 5/85; G11B 20/12
[52] U.S. Cl. ...................... 358/342; 358/343; 358/312; 360/19.1; 360/9.1
[58] Field of Search ........... 358/341, 342, 343, 335, 358/312; 360/8, 9.1, 18, 19; 371/2, 4, 32; 365/234

[56] References Cited

U.S. PATENT DOCUMENTS

| | | | |
|---|---|---|---|
| 3,428,944 | 2/1969 | Shimabukuro | 371/32 |
| 4,142,209 | 2/1979 | Hedlund et al. | 365/234 |
| 4,208,671 | 6/1980 | Ozawa et al. | 358/323 |
| 4,353,090 | 10/1982 | Broadbent | 360/9.1 |
| 4,419,710 | 12/1983 | Sugiyama et al. | 360/133 |
| 4,433,347 | 2/1984 | Sugiyama et al. | 358/342 |
| 4,477,841 | 10/1984 | Chen et al. | 358/342 |
| 4,488,182 | 12/1984 | Takahashi et al. | 358/312 |
| 4,490,752 | 12/1984 | Machida et al. | 358/342 |
| 4,564,867 | 1/1986 | Nakajima | 358/342 |

Primary Examiner—Raymond F. Cardillo
Assistant Examiner—Robert A. Weinhardt
Attorney, Agent, or Firm—Michael N. Meller

[57] ABSTRACT

A digital data transmitting system comprises a first circuit for transmitting digital data related to an information signal data in terms of sectors each having k words with respect to each channel, where k is a natural number. The transmission of the digital data is performed within a predetermined transmission time period once or a plurality of times according to a tolerance of data error rate for an information content of the digital data. The information signal data are among digital data related to a plurality of channels of information signals which are subjected to a digital modulation, and the plurality of channels of information signals are made up of a combination at least including the information signal data among three kinds of information signals. The three kinds of information signals are a non-compressed audio signal, a video signal, and the information signal data other than the non-compressed audio signal and the video signal. The system also comprises a second circuit for adding a code and a synchronizing signal to the digital data which are obtained from the first circuit, and for transmitting the digital data having the first code and the first synchronizing signal added thereto. The first code is at least indicative of a number of times the digital data are repeatedly transmitted within the predetermined transmission time period.

5 Claims, 12 Drawing Figures

| SOU-RCE MODE \ NR/ST | 0 0 | | | 1 1 | | | |
|---|---|---|---|---|---|---|---|
| 0 0 | 3-CH AUDIO | | PICT-URE | MON | DATA | PICTURE | |
| 0 1 | 4-CH AUDIO | | | DATA | DATA | DATA | DATA |
| 1 0 | 2-CH AUDIO | 2-CH AUDIO | | DATA | DATA | PICTURE | |
| 1 1 | 2-CH AUDIO | PICTURE | | | PICTURE | | |

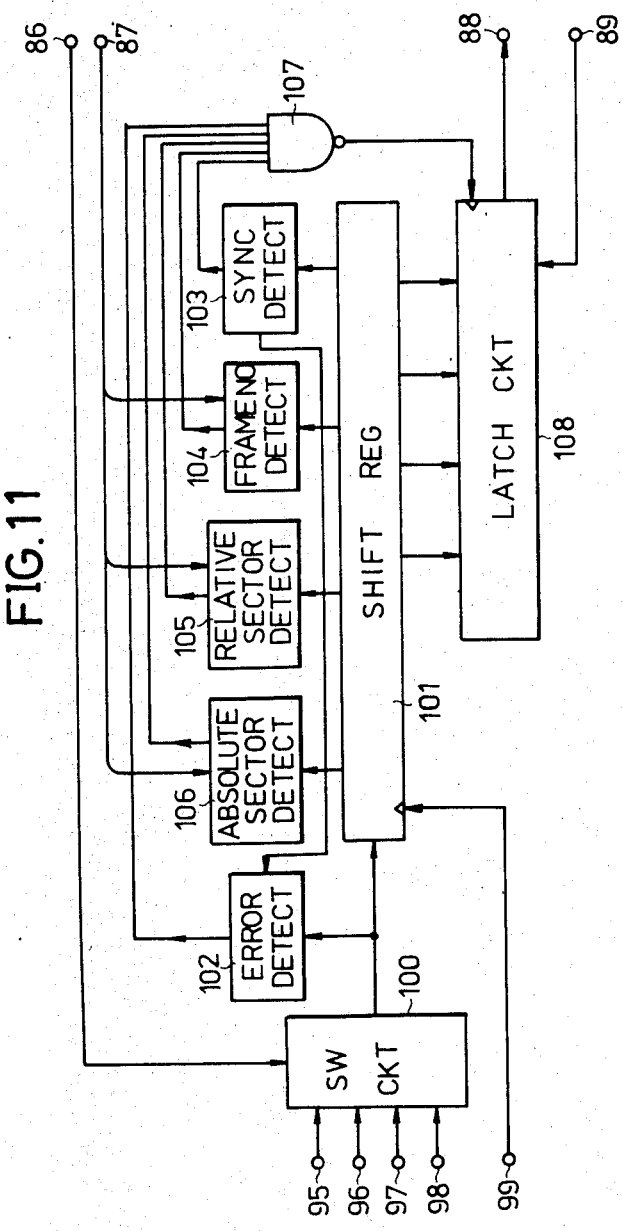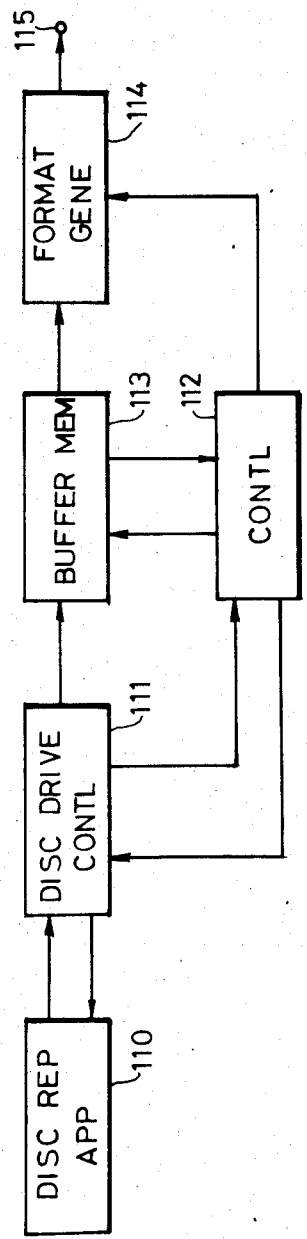

DIGITAL DATA TRANSMITTING SYSTEM FOR TRANSMITTING DIGITAL DATA A NUMBER OF TIMES DEPENDING ON AN INFORMATION CONTENT OF THE DIGITAL DATA

BACKGROUND OF THE INVENTION

The present invention generally relates to digital data transmitting systems, and more particularly to a digital data transmitting system for transmitting digital data which are btained by subjecting an information signal to a digital modulation, with a reduced error in the data. The digital data transmitting system according to the present invention is suited in an application where an information signal recording disc having recorded tracks of digital signals is used as a transmitting medium.

Conventionally, when transmitting digital data which are obtained by subjecting an information signal to a digital modulation, an error correcting code is added to and transmitted together with the digital data as is well known. The error correcting code is transmitted so that a code error which occurs during the transmission process can be corrected in a receiver side or a reproducer side, to enable restoration of the correct data.

However, the error correcting code must be subjected to an arithmetic processing in the reproducing system, regardless of whether the error correcting code is a b-adjacent code, a hamming code, or a fire code. Hence, there is a problem in that the reproducing circuit becomes complex and expensive. On the other hand, it is sometimes necessary to selectively transmit digital information signals other than audio and video signals. Such other digital information signals include a control program signal, a graphic information signal (hereinafter simply referred to as a graphic signal), or a character information signal (hereinafter simply referred to as a character signal) to be loaded into a device (a personal computer, for example) which has a discriminating function and is externally coupled to the reproducing apparatus, a musical note signal for causing the personal computer or the like to automatically play music, and a compressed audio signal which is compressed in the time base direction, the bit direction, or both. These other digital information signals will hereinafter be referred to as "information signal data". Conventionally, when transmitting such information signal data, it is only possible to make error corrections with the same probability by use of the error correcting code, although the effects of the errors in the data may be large or small.

An information signal recording disc (hereinafter simply referred to as a disc) may be used as the transmitting path, but a disc itself which is recorded with the information signal data is not in existence. Further, a plurality of kinds of information signal data may be time-sequentially recorded on one track of the disc. However, in this case, there is a problem in that it is impossible to reproduce a desired kind of information signal data from a desired track position, unless an address signal indicative of the kinds of information signal data is recorded on the disc in addition to an address signal indicative of the track position.

SUMMARY OF THE INVENTION

Accordingly, it is a general object of the present invention to provide a novel and useful digital data transmitting system in which the problems described heretofore have been eliminated.

Another and more specific object of the present invention is to provide a digital data transmitting system which transmits digital data once or repeatedly a plurality of times in terms of k words of the digital data, according to a tolerance of data error rate for the information content of the digital data, where k is a natural number. The digital data transmitting system according to the present invention transmits together with every k words of the digital data, at least a synchronizing signal and a code indicative of a number of times every k words of the digital data is repeatedly transmitted within a predetermined transmitting duration. According to the digital data transmitting system according to the present invention, it is possible to transmit the data efficiently according to the tolerance of the data error rate. With respect to a data having a small tolerance of the data error rate, it is possible to reduce the data error rate compared to the conventional case. In addition, it is unnecessary to perform an arithmetic processing in the receiving system or the reproducing system, because an error correcting code is not transmitted. For this reason, the circuit construction is simple, and the cost of the circuit is low. Further, each word of the digital data may constitute a block together with other information data, another synchronizing signal, an error detecting code, and error correcting codes, and the transmission may be performed in terms of such blocks. In this case, it is possible to further reduce the data error rate, due to the error correction by use of the error correcting codes.

Still another object of the present invention is to provide a digital data transmitting system for transmitting a plurality of channels of digital data which are obtained by subjecting a plurality of channels of information signals to a digital modulation, where the plurality of channels of information signals are made up of a combination at least including an information signal data among three kinds of information signals which are an audio signal, a video signal, and the information signal data other than the audio and video signals. The plurality of channels of digital data are transmitted so that the digital data can be recorded in each of N sectors of one track turn on a disc, with a signal format including a mode code and an address code in addition to the digital data, where N is a natural number greater than or equal to two. According to the digital data transmitting system of the present invention, it is possible to search for a desired track position of a pre-recorded information signal data. In addition, it is also possible to discriminate the kind (a control program signal, a graphic signal, a character signal, or the like) of the pre-recorded information signal data.

A further object of the present invention is to provide a digital data transmitting system which transmits the signals in one sector with a signal format having a fixed length and having a synchronizing signal and an error detecting code added thereto. According to the digital data transmitting system of the present invention, it is possible to reduce the undesirable effects of the data error. A data having the same pattern as the synchronizing signal cannot be transmitted when transmitting a variable length data, but such data can be transmitted according to the present invention. Moreover, compared to the variable length data transmitting system, it is possible to demodulate the digital data within each sector by use of a circuit having a simple circuit construction.

Another object of the present invention is to provide a digital data transmitting system in which the mode code is constituted by a first mode code for indicating the kind of data when upper and lower bits of each of the words of the digital data related to the information signal data are of the same kind, and a second mode code for indicating the combination of the kinds when the upper and lower bits of each of the words of the digital data are of different kinds. According to the digital data transmitting system of the present invention, it is possible to discriminate a large number of kinds of the information signal data by use of the mode code having a small number of bits, and it is possible to discriminate the combination of the kinds when transmitting different kinds of data in the upper and lower bits of one word of the digital data. In addition, because the information signals are divided into three kinds, the combination of the plurality of channels of the digital data can be discriminated without the need to increase the number of bits of the address signal within a signal of one block.

Other objects and further features of the present invention will be apparent from the following detailed description when read in conjunction with the accompanying drawings.

BRIEF DESCRIPTION OF THE DRAWINGS

FIG. 11 is a systematic circuit diagram showing an embodiment of an essential part of the block system shown in FIG. 10; and FIG. 12 is a systematic block diagram showing an embodiment of generating means for generating signals which are transmitted by the transmitting system according to the present invention.

DETAILED DESCRIPTION

The digital data transmitting system according to the present invention can be applied to various fields such as wire communication, radiocommunication, recording and reproduction, because the transmitting system of the present invention is irrespective of the transmitting medium. However, for convenience' sake, description will hereinafter be given for a case where the present invention is applied to a disc. It will be assumed that this disc is of the type previously disclosed in a U.S. patent application Ser. No. 609,193 entitled "ROTARY RECORDING MEDIUM" filed May 11, 1984 now U.S. Pat. No. 4,660,099 in which the assignee is the same as the assignee of the present application. In the present specification, a track such as a recording track on a video disc will be referred to as an "analog recording track". In addition, a track such as a recording track on a digital audio disc will be referred to as a "digital recording track" in the present specification.

Figure 1:
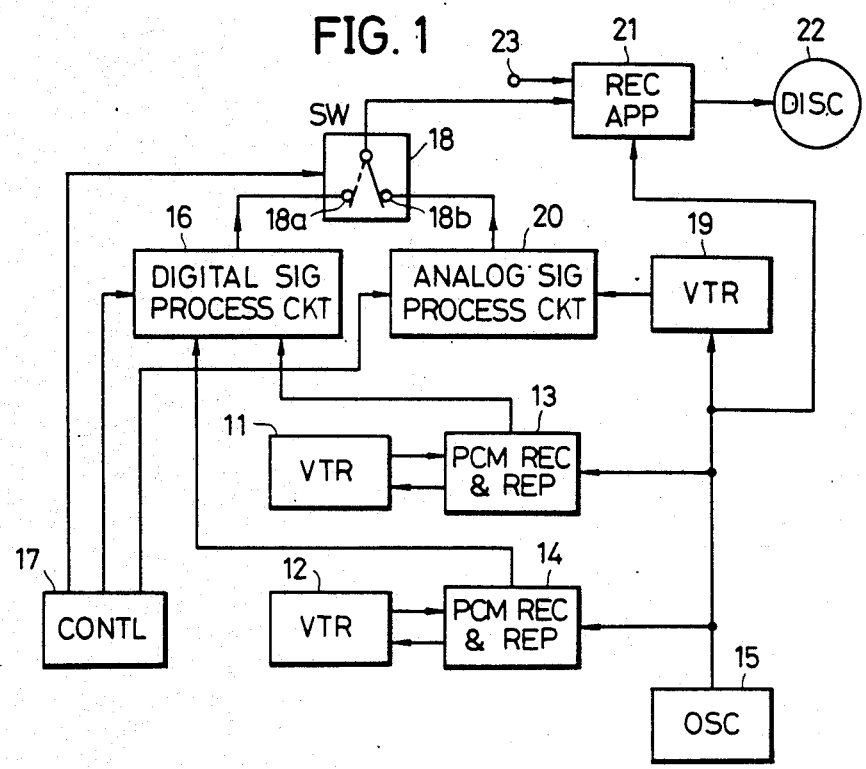
FIG. 1 is a systematic block diagram showing an embodiment of a digital data transmitting system according to the present invention when a disc is used as a transmitting medium.

In FIG. 1, 2-channel video tape recorders (VTRs) 11 and 12 each receive a synchronizing signal from respective PCM recording and reproducing apparatuses 13 and 14. The VTRs 11 and 12 each reproduce two channels of information signals which are pre-recorded on a magnetic tape, and supply the reproduced signals to the respective PCM recording and reproducing apparatuses 13 and 14. There is in total three kinds of information signals which may be pre-recorded on the magnetic tape, namely, an audio signal, a video signal, and an information signal data other than the audio and video signals. The control program signal, the graphic signal, the character signal, the musical note signal, compressed audio signal, or the like described before, fall under such information signal data. As previously disclosed in a U.S. patent application Ser. No. 574,521 filed Jan. 27, 1984 in which the assignee is the same as the assignee of the present application, the control program signal is a biphase modulated signal related to a computer program which is used for carrying out an interactive format reproduction between a disc reproducing apparatus and an external device such as a personal computer having a discriminating function.

In the present embodiment, the information signal data is transmitted in a digital signal transmission path of at least one channel among the transmission paths of four channels. In addition, the video signal is a still picture signal related to a still picture (or a partially moving picture). For example, the still picture signal has a signal format in which component coded data obtained by subjecting signals related to still pictures which are only in video durations of a composite color video signal employing 625 scanning lines to a digital modulation, are successively inserted into video durations of a composite synchronizing signal which is in conformance with the NTSC system.

The PCM recording and reproducing apparatuses 13 and 14 each subject an input signal to a pulse code modulation (PCM), and generate an error detecting code and error correcting codes so as to form a PCM signal including the pulse code modulated signal and these codes. The PCM recording and reproducing apparatuses 13 and 14 each add to this PCM signal horizontal and vertical synchronizing signals which are in conformance with the NTSC system, and record the signal which is obtained to a magnetic tape and reproduce the signal from the magnetic tape. For example, the PCM recording and reproducing apparatuses 13 and 14 each record 6 information words (3 words in each of the right and left channels) in one horizontal scanning period (1H). Since the data is not transmitted in a duration of 35H in one frame, a sampling frequency $f_s$ can be described by an equation $f_s = 3 \times f_H \times (525-35)/525$, where $f_H$ is a horizontal scanning frequency. The PCM recording and reproducing apparatuses are operated in synchronism with a signal from an oscillator 15 having a frequency of 15.734 kHz which is equal to the horizontal scanning frequency of the NTSC system. Thus, when the frequency of 15.734 kHz is substituted into the above equation, the sampling frequency $f_s$ becomes equal to 44.056 kHz.

A total of four channels of digital signals having the sampling frequency of 44.056 kHz and a quantization number of 16 bits, are respectively supplied to a digital signal processing circuit 16 from the PCM recording and reproducing apparatuses 13 and 14. This digital signal processing circuit 16 has a known construction such as the construction previously disclosed in U.S. Pat. No. 4,520,401 issued on May 28, 1985, in which the assignee is the same as the assignee of the present application. The digital signal processing circuit 16 generates a signal of one block (frame) having a signal format shown in FIG. 2, under control of an output signal of a controller 17. The digital signal processing circuit 16 time-sequentially multiplexes the generated signal in terms of blocks, at a transmission frequency of 44.056 kHz. Further, the digital signal processing circuit 16 obtains a frequency modulated signal by frequency-modulating a carrier having a frequency in the range of 7 MHz, for example, by the time-sequentially multiplexed signal, and applies this frequency modulated signal to a terminal 18a of a switching circuit 18.

Figure 2:
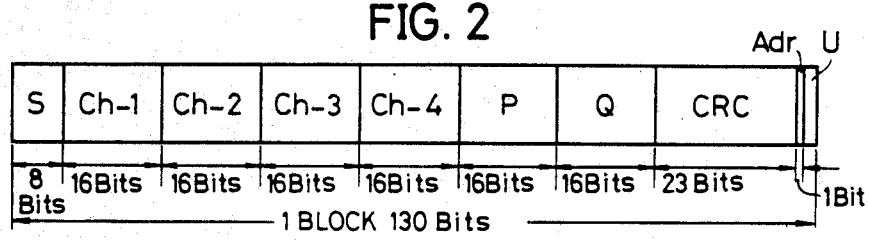
FIG. 2 shows an example of a signal format of one block of digital signals.

In the signal of one block shown in FIG. 2, S indicates the position of a synchronizing signal which has an 8-bit fixed pattern and identifies the beginning of a block. Ch-1, Ch-2, Ch-3, and Ch-4 respectively indicate the position of one word of a digital signal having 16 bits. This digital signal may be a digital audio signal which is obtained by subjecting an audio signal to a pulse code modulation, or a digital video signal which is obtained by subjecting a video signal to a pulse code modulation. For example, the signals described under one of the following cases (a) through (d) may be arranged in the positions Ch-1 through Ch-4.

(a) A case where one word of a digital audio signal related to a monaural audio signal is arranged in the position Ch-1, one word of the digital information data is arranged in the position Ch-2, and the picture element data related to the digital video signal of one channel is arranged in the positions Ch-3, and Ch-4.

(b) A case where one word of the digital information data of each channel is arranged in the positions Ch-1 through Ch-4.

(c) A case where one word of the digital information data of each channel is arranged in the positions Ch-1 and Ch-2, and the picture element data related to the digital video signal of one or two channels is arranged in the positions Ch-3 and Ch-4.

(d) A case where the picture element data related to the digital video signal of the first through fourth channels are arranged in the positions Ch-1 through Ch-4. Further, there is a case where the data are arranged in a digital signal combination similar to the arrangement in the existing digital audio disc. The quantization number of the digital video signal for one picture element is 8 bits, and thus, two picture element data are arranged in one word.

In addition, P and Q in FIG. 2 indicate positions of 16-bit error correcting codes. The error correcting codes P and Q are generated based on the following equations (1) and (2), fo example, where $W_1$, $W_2$, $W_3$, and $W_4$ represent the 16-bit digital signals (normally, digital signals in different blocks) arranged in the positions Ch-1 through Ch-4, T represents a companion matrix of a predetermined polynomial and a symbol "$\oplus$" represents a modulo-2 addition between each of the corresponding bits.

$$P = W_1 \oplus W_2 \oplus W_3 \oplus W_4 \qquad (1)$$

$$Q = T^4 \cdot W_1 \oplus T^3 \cdot W_2 \oplus T^2 \cdot W_3 \oplus T \cdot W_4 \qquad (2)$$

Further, in FIG. 2, CRC indicates a position of a 23-bit error detecting code. The error detecting code is a 23-bit remainder which is obtained when each of the words arranged in the positions Ch-1 through Ch-4, P, and Q of the same block are divided by a generating polynomial of $X^{23} + X^5 + X^4 + X + 1$, for example. When the signals in the 9-th through 127-th bits of the same block are divided by the above generating polynomial during the reproduction and the remainder is zero, it is detected that there is no error in that block. Moreover, in FIG. 2, Adr indicates a multiplexing position of 1 bit of one of various kinds of control signals which are used during a random access and the like. The bits of the control signal are distributed, and 1 bit of the control signal is transmitted in one block. For example, all of the bits of an address signal which is made up of the control signals are transmitted in 196 blocks (in this case, the address signal has 196 bits).

In FIG. 2, U indicates a position of a 2-bit signal which is often called user's bits. One block of the digital signal is therefore made up of 130 bits from the position S to the position U. The digital signal is time-sequentially multiplexed and transmitted in terms of blocks, at a frequency of 44.056 kHz which is equal to the sampling frequency of the digital audio signal.

Figure 3:
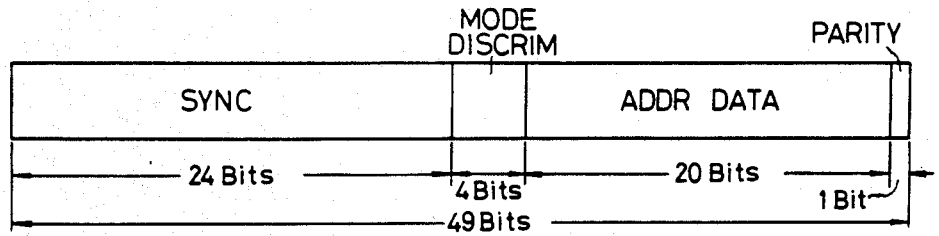
FIG. 3 shows an example of a signal format of an address signal when a predetermined number of bits of a control signal within the digital signals shown in FIG. 2 is collected.

The 196-bit address signal is time-sequentially made up from four kinds of address signals each having 49 bits. The four kinds of address signals each have a signal format shown in FIG. 3. In FIG. 3, a 24-bit synchronizing signal is arranged in the first 24 bits of the address signal as indicated by SYNC, and the value of the 24-bit synchronizing signal differs depending on the four kinds of address signals. 4 bits which are subsequent to the 24-bit synchronizing signal, includes a 2-bit source mode discriminating signal and a 2-bit normal/stop mode discriminating signal NR/ST. The 2-bit source mode discriminating signal indicates the source mode, that is, the combination of the pre-recorded signals from among the cases (a) through (d) described before. The 2-bit normal/stop mode discriminating signal NR/ST indicates whether a stop motion reproduction is to be carried out. The stop motion reproduction is a reproduction in which the same single track turn on the disc is scanned repeatedly. The address data is located in the 20 bits which are subsequent to these 4 bits, and the last 1 bit of the address signal is a parity bit.

Figures 4, 5:
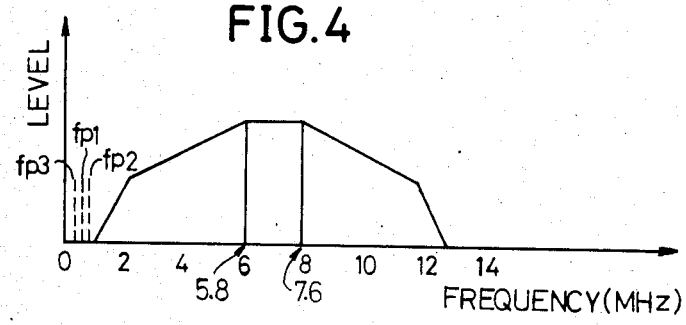
FIG. 4 shows an example of frequency spectrums of a frequency modulated signal and reference signals which are recorded on digital recording tracks on the disc.
FIG. 5 shows an example of a relationship between the value of a mode discriminating signal shown in FIG. 3 and the discriminating content.

The relationship between the value of the 2-bit source mode discriminating signal and the 2-bit normal/stop mode discriminating signal NR/ST and the discriminating content, is shown in FIG. 5. The existing disc reproducing apparatus is designed to carry out a normal reproduction when the value of the normal/stop mode discriminating signal NR/ST is "00", and to carry out the stop motion reproduction when the value of the normal/stop mode discriminating signal NR/ST is "11". The existing disc reproducing apparatus is designed to automatically mute the reproduced audio signal during the stop motion reproduction. However, in the present embodiment, the value is set so that it is indicated that the information signal data is prerecorded when the normal/stop mode discriminating signal NR/ST assumes the value "11" for carrying out the stop motion reproduction In other words, in a case where the discriminating signal NR/ST assumes the value "11" and the source mode discriminating signal assumes the value "00", the four channels of information signals transmitted by the four words Ch-1 through Ch-4 shown in FIG. 2, are one channel of digital audio signal which is related to a monaural audio signal and is indicated by "MON", one channel of digital information data which is related to the information signal data and is indicated by "DATA", and one channel of digital video signal indicated by "PICTURE", as shown in FIG. 5. Hence, this case corresponds to the case (a) described before. Similarly, a case where the source mode discriminating signal assumes the value "01", corresponds to the case (b). A case where the source mode discriminating signal assumes the value "10", corresponds to the case (c). Further, a case where the source mode discriminating signal assumes the value "11", corresponds to the case (d). Therefore, the cases (a) through (d) can be discriminated from the discriminating signal NR/ST and the source mode discriminating signal.

On the other hand, in a case where the discriminating signal NR/ST assumes the value "00", the relationship between the value of the source mode discriminating signal and the information signals of the four channels, is selected to a relationship which is the same as the relationship in the known digital audio disc. In other words, in a case where the discriminating signal NR/ST assumes the value "00" and the source mode discriminating signal assumes the value "00", it is indicated that three channels of digital audio signals and one channel of digital video signal are respectively transmitted in the positions Ch-1 through Ch-4 shown in FIG. 2. When the source mode discriminating signal assumes the value "01", it is indicated that four channels of digital audio signals are respectively transmitted in the positions Ch-1 through Ch-4. In addition, when the source mode discriminating signal assumes the value "10", it is indicated that two kinds of 2-channel digital audio signals are respectively transmitted in the positions Ch-1 through Ch-4. Moreover, when the source mode discriminating signal assumes the value "11", it is indicated that a 2-channel digital audio signal and two channels of digital video signal are respectively transmitted in the positions Ch-1 through Ch-4.

Accordingly, when the disc applied with the transmitting system of the present invention is played on the existing disc reproducing apparatus, the operating mode of the disc reproducing apparatus will not automatically become the stop motion reproduction mode. Thus, it is possible to prevent generation of unpleasant noise from a speaker or prevent damage to the speaker in an extreme case, when this disc is erroneously played on the existing disc reproducing apparatus which does not have a demodulating means for the digital information data. Even when the digital information data is displayed as a picture on a monitoring display device, the monitoring display device itself is subject to no undesirable effects. On the other hand, the disc applied with the transmitting system of the present invention, may be played on the existing disc reproducing apparatus which is coupled to an adapter having the demodulating means for the digital information data, or on a disc reproducing apparatus having a built-in demodulating means for the digital information data. In this case, the disc reproducing apparatus is controlled to assume the normal reproduction mode, and not the stop motion reproduction mode when it is detected that the value of the normal/stop mode discriminating signal NR/ST is "11". Further, the demodulating means for the digital information data is controlled to assume the operating state, so that the digital information data can be demodulated satisfactorily. As a result, it is possible to demodulate and reproduce the control program signal or the like.

In the case where the 49-bit address signal shown in FIG. 3 is a time address signal, the address data of the address signal indicates the reproducing time which would take in the normal reproduction mode to reach the track position where that address signal is recorded, from the starting position where the recording of programs were started at the time of the recording. On the other hand, in the case where the 49-bit address signal is a chapter address signal, the address data of the address signal indicates the location of the music program which is recorded at the position where that address signal is recorded, with respect to the starting position where the recording of the programs were started at the time of the recording. Thus, the chapter address signal indicates that the music program is the third program from the starting position on the disc, for example.

As will be described later on in the specification, the NTSC system color video signal is recorded on a disc 22 at a rate of four fields in one revolution of the disc 22. This means that the recorded signals are reproduced in a state where the disc 22 is rotated at a rotational speed of 889.1 ($=(59.94/4)\times 60$) revolutions per minute. Hence, 2940 ($=44.056\times 10^3(4/59.94)$) blocks are recorded on and reproduced from the disc 22 in one revolution of the disc 22. Accordingly, the 196-bit address signal is recorded on and reproduced from the disc 22, 15 times in one revolution of the disc 22.

When transmitting the digital video signal related to the still picture, the picture element data of the luminance signal and having a sampling frequency of 9 MHz and a quantization number of 8 bits, for example, are converted into luminance picture element data having a sampling frequency of 88.112 kHz by use of a memory. The picture element data of the two kinds of color difference signals (R−Y) and (B−Y) and having a sampling frequency of 2.25 MHz and a quantization number of 8 bits, are converted into color difference picture element data having a sampling frequency of 88.112 kHz by use of a memory. Each of the picture element data having the quantization number of 8 bits, are arranged in the upper 8 bits and the lower 8 bits of one word and transmitted. Hence, two picture element data can be transmitted in one word. Luminance picture element data groups corresponding to four vertical columns on the screen, color difference picture element data groups of the color difference signal (R−Y) corresponding to one vertical column on the screen, and color difference picture element data groups of the color difference signal (B−Y) corresponding to one vertical column on the screen, make up a unit, and the picture element data are time-sequentially transmitted in terms of this unit. As will be described later on in the specification, the information signal data is divided into sectors of a fixed length.

Returning now to the description of FIG. 1, the digital signal processing circuit 16 applies the frequency modulated signal (first FM signal) to the terminal 18a of the switching circuit 18. A frequency spectrum of this first FM signal is indicated by a solid line in FIG. 4. The carrier frequency is equal to 7.6 MHz when the data is "1", and the carrier frequency is equal to 5.8 MHz when the data is "0". In FIG. 4, frequency spectrums represented by phantom lines fp1, fp2, and fp3, indicate the frequency spectrums of reference signals fp1, fp2, and fp3 which are recorded together with the first FM signal in a recording apparatus 21 which will be described later.

On the other hand, a VTR 19 plays a magnetic tape which has been pre-recorded with an NTSC system color video signal related to a moving picture and an audio signal, and supplies to an analog signal processing circuit 20 the signals which are reproduced from the magnetic tape. The analog signal processing circuit 20 generates a frequency modulated signal having the same signal format as the frequency modulated signal which is recorded on the video disc described before, and multiplexes each of the various kinds of address signals within the vertical blanking period. The concrete construction of the analog signal processing circuit 20 is disclosed in the U.S. Pat. No. 4,208,671 in which the assignee is the same as the assignee of the present application, for example, and is known. Thus, detailed description will not be given with respect to the concrete construction of the analog signal processing circuit 20.

The analog signal processing circuit 20 produces a band-share-multiplexed signal in which a band limited luminance signal and a low-band-converted carrier chrominance signal which has been frequency-converted into a low frequency range are band-share-multiplexed. The analog signal processing circuit 20 also independently produces a chapter address signal $A_C$, a time address signal $A_T$, and a track number address signal $A_N$. These address signals are multiplexed into specific durations of 1H (one horizontal scanning period) within the vertical blanking period of the band-share-multiplexed signal, so as to obtain a predetermined multiplexed signal. A predetermined carrier is then frequency-modulated by a signal which is obtained by subjecting the predetermined multiplexed signal to a frequency-division-multiplexing with a frequency modulated audio signal. The address signal $A_C$ indicates the recorded position on the disc in terms of the order of the recorded programs, and the time address signal $A_T$ indicates the total reproducing time. In addition, the track number address signal $A_N$ indicates the number of tracks when it is assumed that one track is formed from the recorded position of the reference signal fp3 as the disc undergoes one revolution. The address signals $A_C$, $A_T$, and $A_N$ each comprise 29 bits.

Figure 6:
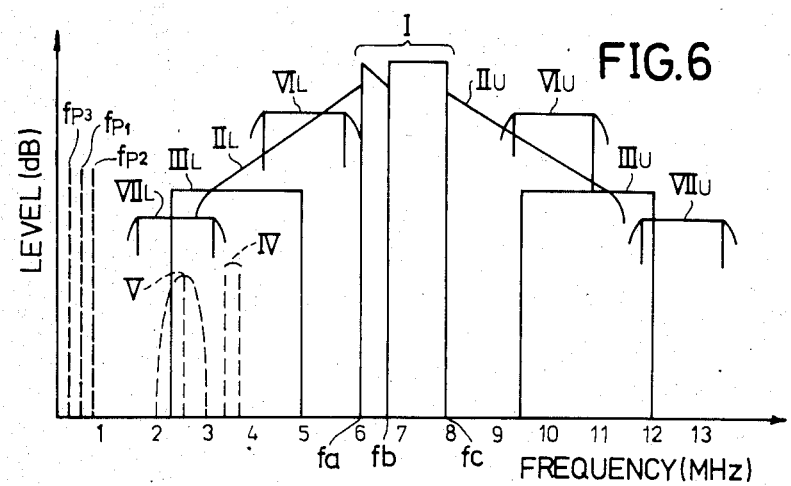
FIG. 6 shows an example of frequency spectrums of a frequency modulated signal and reference signals which are recorded on analog recording tracks on the disc.

FIG. 6 shows a frequency spectrum of the output signal of the analog signal processing circuit 20. In FIG. 6, I represents a carrier deviation band of 2.3 MHz of the frequency modulated luminance signal, $f_a$ represents a frequency of 6.1 MHz corresponding to the synchronizing tip, $f_b$ represents a frequency of 6.6 MHz corresponding to the pedestal level, and $f_c$ represents a frequency of 7.9 MHz corresponding to the white peak.

Further, $II_U$ and $II_L$ respectively represent upper and lower sidebands of the frequency modulated luminance signal, and $III_U$ and $III_L$ respectively represent upper and lower sidebands of the signal which is obtained by further frequency-modulating frequency modulated audio signals $f_{A1}$ and $f_{A2}$. Moreover, IV represents carriers of 3.43 MHz and 3.73 MHz of the 2-channel frequency modulated audio signals $f_{A1}$ and $f_{A2}$.

In addition, V represents a frequency band of the low-band-converted carrier chrominance signal which is obtained by frequency-converting the carrier chrominance signal within the reproduced signal from the VTR 19. First sidebands which are obtained when the low-band-converted carrier chrominance signal is frequency-modulated, are represented by $VI_U$ and $VI_L$, and second sidebands which are obtained when the low-band-converted carrier chrominance signal is frequency-modulated, are represented by $VII_U$ and $VII_L$. In FIG. 6, the frequency spectrums of the signals which are obtained from the analog signal processing circuit 20, are indicated by solid lines.

The reference signals fp1, fp2, and fp3 described later on in the specification, are located in the unoccupied frequency band below the band $VII_L$ shown in FIG. 6. The occupying frequency bands of the reference signals fp1 through fp3 and the information signals are separated, because the reference signals fp1 through fp3 and the information signals need to be picked up from the disc by the same reproducing stylus.

The first FM signal having the frequency spectrum indicated by the solid line in FIG. 4 is applied to the terminal 18a of the switching circuit 18, and a second FM signal having the frequency spectrum indicated by the solid line in FIG. 6 is applied to a terminal 18b of the switching circuit 18. The switching circuit 18 selectively produces and supplies only one of the first and second FM signals to the recording apparatus 21 under control of an output signal of the controller 17. The recording apparatus 21 is a known cutting apparatus which employs a laser beam. The recording apparatus 21 is supplied with the output signal of the switching circuit 18 as a first input signal, and a signal from an input terminal 23 as a second input signal. This second input signal from the input terminal 23 comprises a reference signal in which the first and second reference signals fp1 and fp2 are alternately switched and arranged in a burst manner for every duration of four fields which is equal to a duration of one revolution of the disc, and the third reference signal fp3 which is generated in relation to the position where the first and second reference signals fp1 and fp2 switch. The recording apparatus 21 converts the first and second input signals to first and second modulated laser beams, and simultaneously impinges the first and second modulated laser beams on a photosensitive agent which covers the surface of an original recording disc, with the first and second modulated laser beams mutually separated by approximately ½ track pitch. Then, the original recording disc is subjected to a known developing process, and to a known disc manufacturing process. As a result, the disc 22 which is produced, has an electrode function, does not have guide grooves for guiding the reproducing stylus, and has a track pattern shown in FIG. 7.

Figure 7:
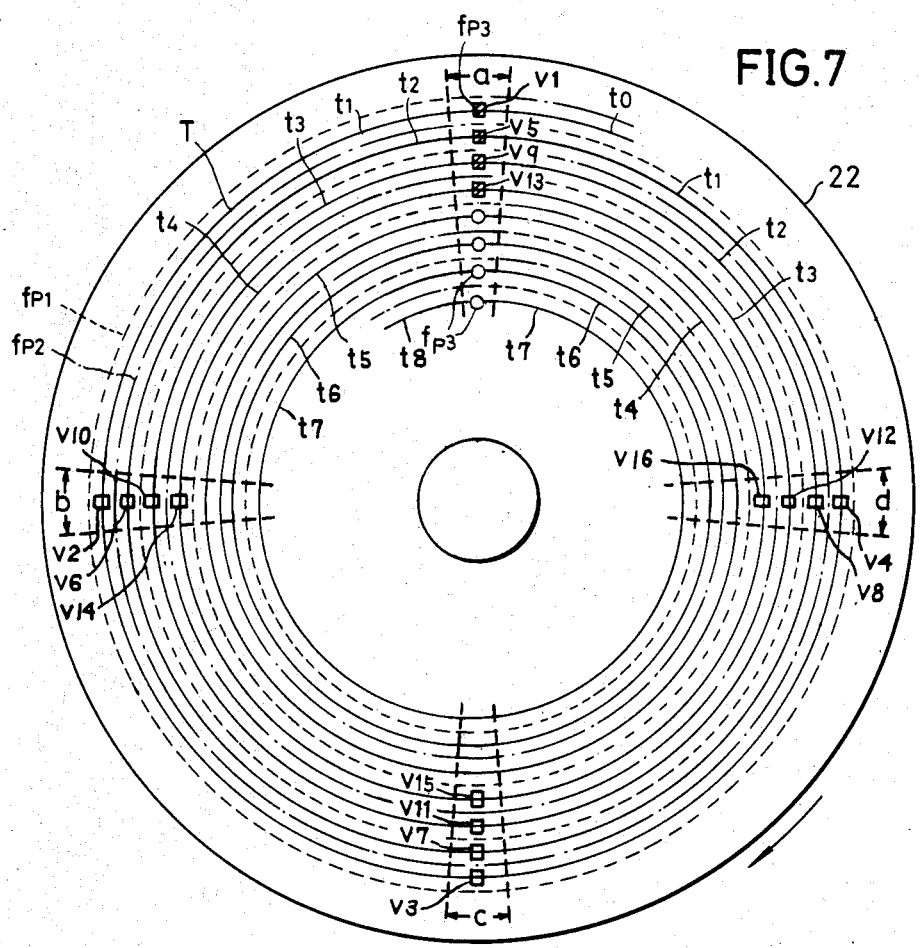
FIG. 7 shows an example of a track pattern on the disc.

The first FM signal or the second FM signal from the switching circuit 18, is recorded on a spiral track T on the disc 22 shown in FIG. 7, as rows of intermittent pits. In the single and continuous spiral track T which is indicated by a solid line in FIG. 7, each track turn of the disc 22 is represented by t1, t2, t3, . . . . Each track is formed with pits of the information signal on a flat surface thereof, and no guide groove is formed for guiding the reproducing stylus. With respect to one track turn, pits of the first reference signal fp1 and pits of the second reference signal fp2 are respectively formed on both sides thereof along the longitudinal direction of the track for every horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are alternated for each track turn. In other words, the tracks of the first reference signal fp1 are represented by broken lines, and the tracks of the second reference signal fp2 are represented by one-dot chain lines in FIG. 7. Positions where the vertical synchronizing signal is recorded in each field, are represented by $V_1$, $V_2$, $V_3$, . . . . Furthermore, the third reference signal fp3 is recorded for a duration of approximately 3H, for example, at the starting positions of the tracks t1, t2, t3, . . . , that is, the positions $V_1$, $V_5$, $V_9$, . . . where the sides on which the reference signals fp1 and fp2 are recorded are interchanged.

The address signals $A_C$, $A_T$, and $A_N$ are time-sequentially recorded in recording parts a through d which correspond to the four vertical blanking periods in each of the analog recorded tracks t1 through t4 on the disc 22.

The digital recorded tracks t5, t6, t7, . . . are also formed on the spiral track T. However, the signal of one block having the signal format shown in FIG. 2, is time-sequentially multiplexed at the transmission frequency of 44.056 kHz and is recorded on the digital recorded tracks t5 through t7 as the first FM signal. Thus, the recording parts a through d which correspond to the vertical blanking periods, do not exist in the digital recorded tracks t5 through t7. On the other hand, the reference signal fp3 is recorded on the digital recorded tracks t5 through t7, radially aligned with the reference signal fp3 which is recorded on the analog recorded tracks t1 through t4. Moreover, the reference signals fp1 and fp2 are recorded on both sides of the digital recorded tracks t5 through t7 with a period of 1H. In other words, the reference signals fp1 through fp3 are constantly recorded on the disc with constant periods, regardless of whether the recorded track is an analog recorded track or a digital recorded track.

The track pattern itself is the same as the track pattern on the digital audio disc which has been previously proposed under the same assignee. In addition, the signal format (FIG. 2) of the digital signal recorded on the digital recorded tracks, and the modulated signal format (FIG. 4), are the same as those of the above digital audio disc. However, according to the present invention, the information signal data are transmitted as information data to be recorded on the disc, with a signal format shown in FIG. 8(C). In other words, the information signal data is transmitted once or repeatedly a plurality of times, according to the tolerance of the data error rate for the information content.

The information signal data is divided into N sectors in one revolution of the disc and recorded thereon for each channel, where N is a natural number greater than or equal to two. In each of the sectors, the recorded information signal data has a signal format in which a mode code indicative of the kind (content) of the information signal data and an address code indicative of the recorded track position are added to the digital data. It will be assumed that one track is counted when the disc undergoes one revolution with respect to a starting position which is the recorded position of the third reference signal fp3. A total of 2940 blocks each having the constitution shown in FIG. 2, are time-sequentially recorded on one digital recording track. Accordingly, the four channels of digital signals each having one word thereof arranged and transmitted in the respective positions Ch-1 through Ch-4 shown in FIG. 4, are recorded such that 2940 words (2940×16 bits) are recorded on one digital recording track for one channel. Among the three kinds of information signals (the video signal related to the still picture, the audio signal, and the information signal data) which are recorded on the digital recording track, the signal formats of the video signal (digital video signal) and the audio signal (digital audio signal) are set to signal formats which are the same as the signal formats employed in the digital audio disc described before.

Figure 8:
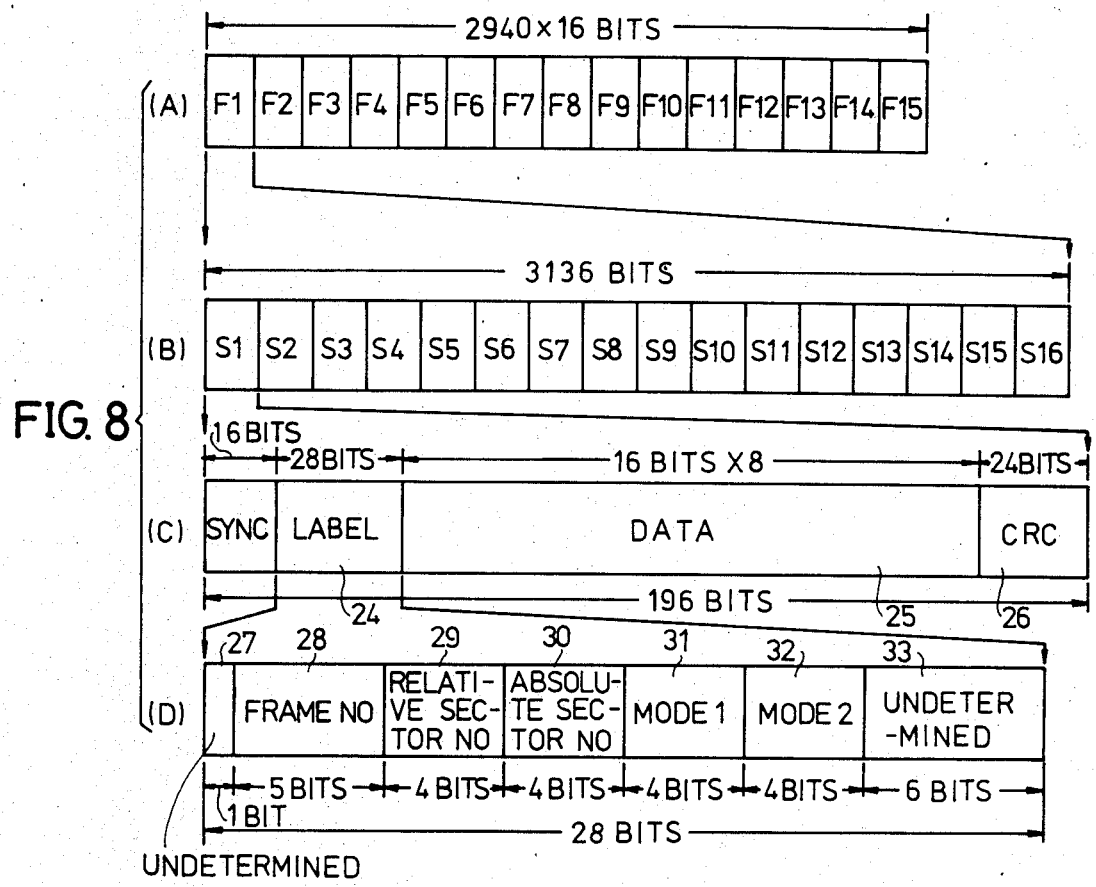
FIGS. 8(A) through 8(D) are diagrams for explaining an embodiment of a signal format of digital signals which are transmitted by the transmitting system according to the present invention.

On the other hand, the information signal data has the following signal format. As shown in FIG. 8(A), the information signal data to be recorded on one digital recording track, is divided into 15 frames F1 through F15 with respect to one channel. Each of the frames F1 through F15 comprise 3136 bits. Further, the frames F1 through F15 are each divided into 16 sectors S1 through S16 as shown in FIG. 8(B). Accordingly, each sector comprises 196 bits as shown in FIG. 8(C). A synchronizing signal SYNC having a predetermined fixed pattern is arranged in the first 16 bits of the 196 bits which constitute one sector. A label represented by LABEL is made up of the address code and the mode code, and is arranged at a position 24 in the 28 bits which follow the 16-bit synchronizing signal SYNC of this one sector. 8 digital data each related to a 16-bit information signal data, are time-divisionally arranged at a position 25 in the 128 bits which follow the 28-bit label LABEL. Further, an error detecting code CRC is arranged at a position 26 in the remaining 24 bits which follow the 128-bit data which are represented by DATA. example, the error detecting code CRC is a 24-bit remainder which is obtained when the value in the 17-th through the 171-st bits of the same one sector is divided by a predetermined generating polynomial. Of course, the error detecting code CRC arranged in the position 26 shown in FIG. 8(C), is completely different from the error detecting code arranged at the position CRC shown in FIG. 2.

The digital data of the information signal data differs in the bit length according to the information content, but it can be assumed that the digital data has a bit length of 128×n bits, where n is a natural number. In other words, the digital data can be allocated to a data region which can be described in terms of 128×n bits. For example, a digital data under 8 words (128 bits) is allocated to a data region in one sector. A digital data over 9 words and under 16 words, is allocated to the respective data regions (amounting to a total of 256 bits) in two sectors. A digital data over 17 words are allocated to the data regions in sectors in a similar manner. Hence, the digital data is allocated to sectors having a fixed bit length. When the digital data length is not a natural number multiple of 128 bits, a dummy data is inserted into the remaining part of the data region in the sector, since a data re-arrangement is performed as will be described later on in the specification.

The 28-bit label LABEL arranged at the position 24 in the sector having the fixed length shown in FIG. 8(C), has a signal format shown in FIG. 8(D). In FIG. 8(D), the first 1-bit signal 27 and the last 6-bit signal 33 are undetermined, and a frame number is arranged at a position 28 which extends over 5 bits from the second to the sixth bits. A relative sector number is arranged at a position 29 which extends over 4 bits following the 5 bits provided for the frame number, and an absolute sector number is arranged at a position 30 which extends over 4 bits following the 4 bits provided for the relative sector number. The total of 13 bits arranged in the positions 28 through 30, constitute an address code. The frame number indicates the number (position) of the frame among the 15 frames recorded on one digital recording track. For example, the frame number indicates that the frame is the seventh frame among the 15 frames. The absolute sector number indicates the number (position) of the sector among the 16 sectors within one frame. For example, the absolute sector number indicates that the sector is the tenth sector among the 16 sectors.

In FIG. 8(D), a mode code is arranged at the positions 31 and 32 which extend over 8 bits from the 15-th to the 22-nd bits. This mode code is made up of a first mode code and a second mode code. The first mode code constitutes the first 4 bits of the mode code, and are arranged at the position 31 indicated by "MODE 1". On the other hand, the second mode code constitutes the latter 4 bits of the mode code, and are arranged at the position 32 indicated by "MODE 2". When the same kind of information signal data are transmitted in one word having 16 bits, the first mode code indicates the kind of the information signal data. As described before, there are various kinds of information signal data, such as the control program signal, the graphic signal, the character signal, the musical note signal, and the compressed audio signal. When different kinds of digital data are transmitted in the upper and lower bytes of each of the words in the 128-bit data region 25 shown in FIG. 8(C), the second mode code indicates the kinds of the digital data. As an example of a case where different kinds of digital data are transmitted in the upper and lower bytes of each of the words, there is a case where 8 bits of the compressed audio signal is transmitted in the upper byte and the digital data of another kind of information data is transmitted in the lower byte. In this case, it is possible to simultaneously reproduce two kinds of digital data in the reproducing apparatus. Hence, it is possible to load a program into the personal computer while reproducing the audio signal which is obtained by subjecting the compressed audio signal to a time base expansion, for example.

An example of the relationship between the values of the first and second mode codes and the kinds of digital data, is shown in the following Table 1.

TABLE 1

| MODE 1 | CONTENT OF DATA | MODE 2 | CONTENT OF DATA |
| --- | --- | --- | --- |
| 0000 | Content of MODE 2 | 0000 | Undetermined |
|  |  | 0001 | Upper byte: compressed audio signal Lower byte: control program signal |
|  |  | 0010 | Upper byte: compressed audio signal Lower byte: graphic signal |
| . | . | . | . |
| 0001 | Control program signal | — | — |
| 0010 | Graphic signal | — | — |
| . | . | . | . |
| 1000 | Content of MODE 2 | 0000 | Undetermined |
|  |  | 0001 | Upper byte: compressed audio signal Lower byte: character signal |
|  |  | 0010 | Upper byte: compressed audio signal Lower byte: musical note signal |
| . | . | . | . |
| 1001 | Character signal | — | — |
| 1010 | Musical note signal | — | — |
| 1011 | Compressed audio signal | — | — |
| . | . | . | — |

As may be seen from Table 1, when the value of the 4 bits in the first mode code "MODE 1" is "0000" or "1000", the content of the data in the second mode code "MODE 2" indicates the kind of the information signal data recorded on the digital recording track on the disc for the upper and lower bytes of each of the words. In other cases, it is indicated that the same kind of information signal data is transmitted in each of the 16-bit words, and the kind of the information signal data can be discriminated from the value of the first mode code "MODE 1".

The relative sector number arranged at the position 29 of the label LABEL shown in FIG. 8(D), indicates the number of times the information signal data within the sector is repeatedly transmitted. Because 16 sectors exist in one frame, the information signal data within the sector may be repeatedly transmitted (recorded in an overlap) up to 16 times at the maximum. Some information signal data have a relatively large tolerance of the data error rate and the effects of data error to a certain extent are negligible, while other data have an extremely small tolerance of the data error rate and the effects of even a data error of 1 bit are considerably large. In the case where the tolerance of the data error rate is extremely small, the personal computer which is externally coupled to the disc reproducing apparatus for the purpose of the interactive format reproduction may run out of control, or the characters to be displayed may be displayed in the form of completely different characters, when even a data error of 1 bit exists within the information signal data. Hence, according to the present invention, the number of times the same data is repeatedly transmitted is large for the information signal data having the extremely small tolerance of the data error rate and the number of times the same data is repeatedly transmitted is small (zero at the minimum) for the information signal data having the relatively large tolerance of the data error rate. Thus, the relative sector number indicates this number of times the same data is repeatedly transmitted.

For example, in a case where the digital data is repeatedly transmitted 16 times, the digital data in each of the 8 words in the 16 sectors S1 through S16 of one frame become the same. Thus, the relative sector number assumes the value "0000" in all of the sectors S1 through S16. Similarly, in a case where the digital data is repeatedly transmitted 4 times, the digital data in each of the 8 words in the sectors S1 through S4, the sectors S5 through S8, the sectors S9 through S12, and the sectors S13 through S16 become the same, respectively. In this case, the relative sector number assumes the value "0000" in the sectors S1 through S4, the value "0001" ("1" in decimal) in the sectors S5 through S8, the value "0010" ("2" in decimal) in the sectors S9 through S12, and the value "0011" ("3" in decimal) in the sectors S13 through S16. Similarly, the relative sector number assumes different values in the sectors for different number of times the same digital data is repeatedly transmitted. The following Table 2 shows the number of times the same data is repeatedly transmitted, and the range of decimal values of the relative sector number in the sectors.

TABLE 2

| Number of times data is repeatedly transmitted | Value of relative sector number |
|---|---|
| 1 | 0 to 15 |
| 2 | 0 to 7 |
| 4 | 0 to 3 |
| 8 | 0 to 1 |
| 16 | 0 |

In the Table 2, the case where the number of time the digital data is repeatedly transmitted is "1", indicates a case where no digital data is repeatedly transmitted (one digital data is transmitted only once), that is, a case where mutually different digital data are transmitted in the sectors S1 through S16 within one frame. In this case, the relative sector number assumes the decimal value "0" in the sector S1, the decimal value "1" in the sector S2, ..., and the decimal value "15" in the sector S16.

Figure 9:
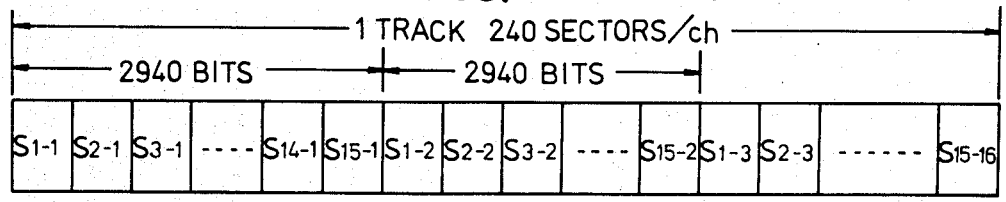
FIG. 9 schematically shows an example of the transmitting sequence of signals in sectors.

As described heretofore, the digital data of the information signal data are recorded on one digital recording track in terms of a fixed length of 15 frames having a total of 240 sectors, with respect to one channel, where each sector has the signal format shown in FIG. 8(C). The 240 sectors which are recorded on one digital recording track, are not recorded in the order of the frames. The sequence of the data in the sectors are re-arranged, and the data are recorded in the sequence shown in FIG. 9, for example. As shown in FIG. 9, the first sectors S1-1 through S15-1 from each of the frames F1 through F15 are time-sequentially recorded, the second sectors S1-2 through S15-2 from each of the frames F1 through F15 are time-sequentially recorded thereafter, and the sectors located at the same position in each of the frames are time-sequentially recorded in succession in a similar manner. In FIG. 9, a j-th sector Sj within an i-th frame is represented by Si-j, where i =1, 2, ..., 15 and j=1, 2, ..., 16 in this case.

The 240 sectors are recorded on one digital recording track with the sequence re-arranged as shown in FIG. 9, that is, interleaved, so as to reduce the effects of the error when a dropout occurs in a part of the reproduced signal during the reproduction.

Next, detailed description will be given with respect to generating means for generating digital signals which have the signal formats shown in FIGS. 8(A) through 8(D) and are transmitted by the transmitting system according to the present invention. In FIG. 12, a disc reproducing apparatus 110 plays a floppy disc (not shown), for example, under control of a disc drive controller 111. For example, the floppy disc is recorded with two channels of digital data related to the information signal data, and the first and second mode codes 31 and 32 shown in FIG. 8(D). The two channels of digital data, are among four channels of information signals which are subjected to a digital modulation, for example. The four channels of information signals are made up of a combination at least including the information signal data among three kinds of information signals, where the three kinds include a non-compressed audio signal, a video signal, and the information signal data other than the non-compressed audio signal and the video signal.

The digital data are reproduced from the floppy disc in terms of 8 words with respect to one channel. The disc reproducing apparatus 110 is controlled responsive to an output signal of the disc drive controller 111 which is supplied with a control signal from a controller 112, and the digital data are reproduced from the floppy disc repeatedly for a number of times in accordance with the tolerance of the data error rate. The signals reproduced from the floppy disc are supplied to a buffer memory 113 throgh the disc drive controller 111, and the reproduced signals are written into the buffer memory 113 responsive to a clock pulse from the controller 112. The data related to the number of times that the same data is reproduced repeatedly, is supplied to a format generator 114 from the disc drive controller 111, through the controller 112. The format generator 114 converts this data supplied thereto, into the relative sector number described before.

The format generator 114 receives the digital data which are read out from the buffer memory 113 and the first and second mode codes. In addition to the generation of the relative sector number, the format generator 114 also generates the synchronizing signal, the frame number, the absolute sector number, the error detecting code CRC, or the like, and arranges the generated signals so that the signal formats shown in FIGS. 8(A) through 8(D) are obtained. The digital signals obtained from the format generator 114, are supplied through an output terminal 115 to the VTR 11 and/or the VTR 12 as recording signals. When the disc 22 is not used as the transmission path, the output digital signals of the format generator 114 are transmitted through a desired transmission path.

The digital audio disc which was previously proposed under the same assignee is rotated at a rotational speed of 900 rpm, and 2940 blocks are recorded on or reproduced from the digital audio disc in one revolution of the disc. Further, the transmission frequency of one block is equal to 44.1 kHz. On the other hand, in the present embodiment, 2940 blocks are recorded on or reproduced from the disc in one revolution of the disc, however, the disc is rotated at a rotational speed of 899.1 rpm which is the same as the rotational speed of the video disc. Moreover, the transmission frequency of one block is equal to 44.056 kHz which is extremely close to the frequency of 44.1 kHz.

Figure 10:
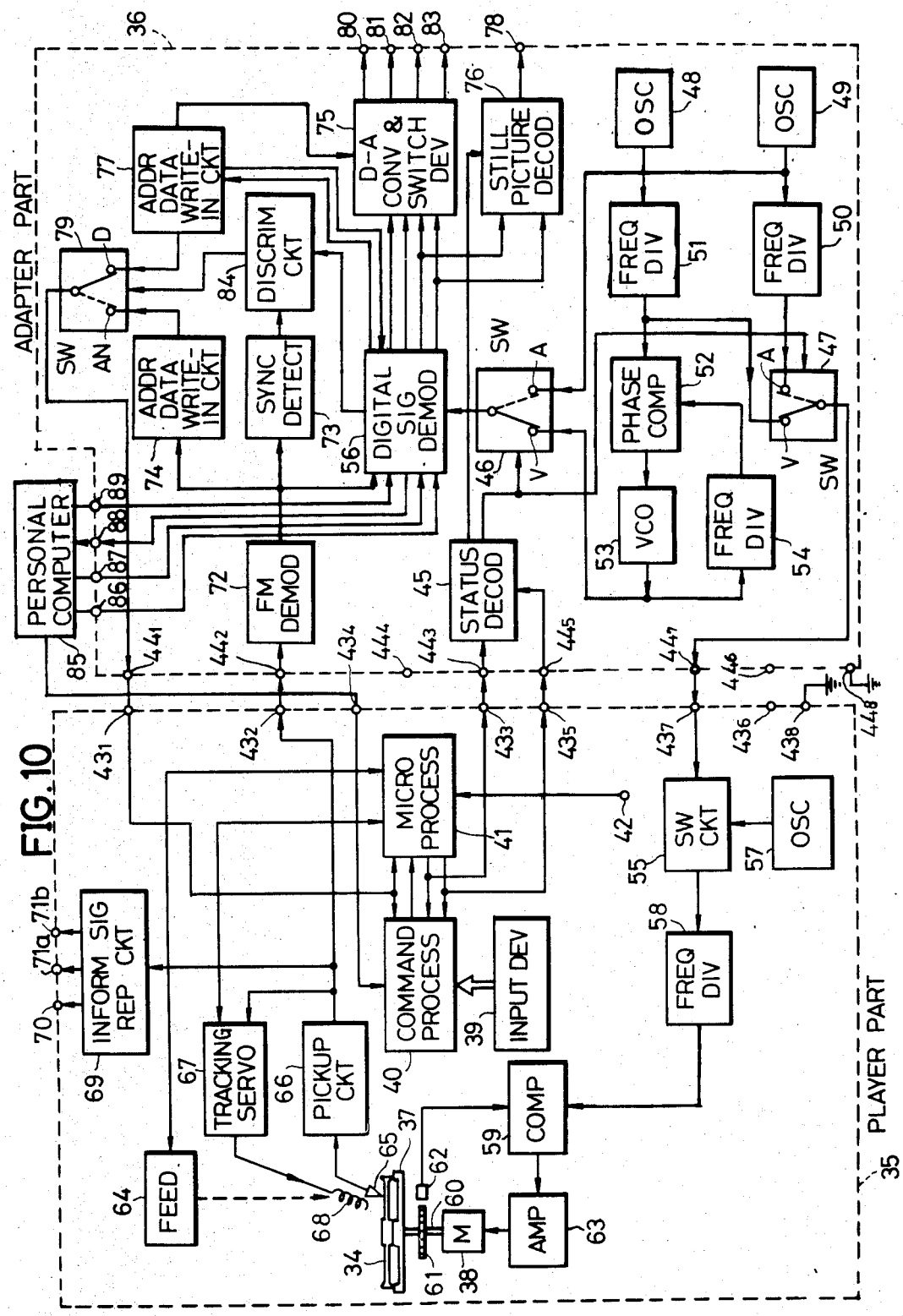
FIG. 10 is a systematic block diagram showing an example of a disc reproducing apparatus for a case where the disc is used as the transmitting medium.

Next description will be given with respect to a disc reproducing apparatus for playing the disc 22 which has digital recording tracks recorded with one or more channels of information signal data in terms of sectors of a fixed length each having 8 words, by referring to FIG. 10. The block system itself of the disc reproducing apparatus shown in FIG. 10, is basically the same as the block system of the disc reproducing apparatus previously disclosed in the U.S. patent application Ser. No. 609,193 filed May 11, 1984 now U.S. Pat. No. 4,660,099 in which the assignee is the same as the assignee of the present application. However, the construction of a digital signal demodulating circuit 56 and an address data write-in circuit 77 are different from those of the above previously disclosed disc repoducing apparatus. Further, the disc reproducing apparatus shown in FIG. 10 is different in that it is coupled to a personal computer 85. In other words, when the address data write-in circuit 77 detects that the latter 2 bits of the 4 bits indicated by "MODE DISCRIM" in FIG. 3 are "11", an information signal data demodulating circuit within the digital signal demodulating circuit 56 is operated. When it is detected in the existing disc reproducing apparatus that this latter 2 bits of the 4 bits indicated by "MODE DISCRIM" in FIG. 3 are "11", a stop motion reproduction will be carried out. However, the disc reproducing apparatus shown in FIG. 10 should carry out a normal reproduction in this case. Therefore, with respect to a player part 35, the address data write-in circuit 77 supplies the latter 2 bits after converting the value "11" to a value "00", so that the normal reproduction is carried out. As a result, it is possible to satisfactorily demodulate and reproduce the information signal data which are reproduced from the digital recording tracks on the disc 22.

In FIG. 10, the disc reproducing apparatus generally comprises the player part 35 and an adapter part 36. A turntable 37 within the player part 35, is rotated by a motor 38. When a load switch of an input device 39 is manipulated, an output signal of this load switch is supplied to a command processor 40, and is then supplied to a microprocessor 41. Signals from the input device 39 command signals from an external device such as a personal computer 85 having a discriminating function, and the like, are supplied to the command processor 40. The command processor 40 carries out operations such as driving a display device (not shown) according to a display mode, and transferring the signals from the input device 39 to the microprocessor 41.

As will be described later on in the specification, the microprocessor 41 generates and supplies signals such as a clock signal and a status signal to the command processor 40. On the other hand, the microprocessor 41 controls the operations of various mechanisms and circuits within the player part 35, and puts the player part 35 in a state where a disc 34 can be inserted into the player part 35 from the outside in response to the output signal of the load switch. As described in the U.S. Pat. No. 4,352,174 in which the assignee is the same as the assignee of the present application, the disc 34 is accommodated within a disc accommodating case (not shown) when the disc 34 is outside the player part 35. When the disc accommodating case accommodating therein the disc 34 is inserted into the player part 35 in the above state and is then extracted from the player part 35, predetermined mechanisms operate to keep the disc 34 and a lid plate of the disc accommodating case inside the player part 35. Description of the predetermined mechanisms will be omitted in the present specification. As a result, only an empty jacket of the disc accommodating case is extracted from the player part 35. The disc 34 is placed onto the turntable 37 inside the player part 35.

On the other hand, at the same time, a plurality of microswitches (not shown) located at the innermost part of the player part 35 are turned ON and OFF depending on the combination of the existence and non-existence of cutouts located on the front end of the lid plate. As disclosed in a U.S. Pat. No. 4,419,710 in which the assignee is the same as the assignee of the present application, it is possible to detect various recorded contents on the disc, the side of the disc to be reproduced, and the like, from the ON and OFF states of the microswitches. The output signals of the microswitches, such as a disc discriminating signal which indicates whether the disc 34 is a digital audio disc or a video disc (it will be assumed that the disc according to the present invention is discriminated as being a video disc), are supplied to the microprocessor 41 through an input terminal 42. Hence, the microprocessor 41 serially supplies a 25-bit status signal, for example, to a pin terminal $43_3$ of a DIN-type 8-pin connector.

The 8-pin connector comprises pin terminals $43_1$ through $43_8$. The address data from the adapter part 36 is applied to the pin terminal $43_1$, and a reproduced signal (RF signal) is produced through the pin terminal $43_2$ as will be described hereinafter. A command signal of an external device such as the personal computer 85 having a discriminating function, is applied to the pin terminal $43_4$. The clock signal from the microprocessor 41 is produced through the pin terminal $43_5$. An external synchronizing signal from the adapter part 36, is applied to the pin terminal $43_7$. Further, the pin terminal $43_8$ is grounded, and the pin terminal $43_6$ is not used. When coupling the player part 35 to a personal microcomputer or the like, unlike in the case where the player part 35 is coupled to the adapter part 36, the address data is produced from the pin terminal $43_1$, the reproduced audio signal is produced through the pin terminal $43_6$, and the pin terminal $43_7$ is not used.

The status signal from the microprocessor 41 shown in FIG. 10, is produced in synchronism with the clock signal. This status signal is supplied to a status decoding circuit 45 wherein the value of the second bit of the status signal is detected, through a pin terminal $44_3$ of a DIN-type 8-pin connector. The second bit of the status signal indicates whether the disc 34 is a digital audio disc or a video disc (the disc 22 will be detected as a video disc), and this second bit is supplied to the switching circuits 46 and 47. The fourth bit of the status signal indicates whether the recorded video signal on the disc 34 is of the system employing 525 scanning lines or the system employing 625 scanning lines, and this fourth bit is supplied to a still picture decoder 76. The clock signal is supplied to the status decoding circuit 45 and the like, through the pin terminals $43_5$ and $44_5$.

Oscillators 48 and 49 are provided within the adapter part 36. The oscillator 48 produces a signal having a frequency which is four times the chrominance subcarrier frequency (3.579545 MHz in this case) of the color video signal which is to be originally reproduced in a monitoring reproducing apparatus (not shown) which is supplied with the reproduced composite video signal from the disc reproducing apparatus. The oscillator 49 produces a signal having a frequency of 6.174 MHz which is 140 times the transmission frequency of the digital signals (blocks) in the digital audio disc. The output signal of the oscillator 49 having the frequency of 6.174 MHz is supplied to a terminal A of the switching circuit 46. Further, the output signal of the oscillator 49 is frequency-divided by 1/392 into a signal having a frequency of 15.75 kHz in a frequency divider 50. On the other hand, the output signal of the oscillator 48 is frequency-divided by 1/910 into a signal having the horizontal scanning frequency of 15.734 kHz in a frequency divider 51. The output signal of the frequency divider 51 is supplied to a phase comparator 52 and to a terminal V of the switching circuit 47.

The phase comparator 52 constitutes a known phase locked loop (PLL) together with a voltage controlled oscillator (VCO) 53 and a 1/392-frequency divider 54. A signal having a frequency which is 392 times the horizontal scanning frequency of 15.734 kHz, is supplied to a terminal V of the switching circuit 46 from the VCO 53. That is, the output signal frequency of the VCO 53 is equal to 6.1678 MHz which is 140 times the transmission frequency of 44.056 kHz of the digital signals on the digital recorded tracks. The output signal of the VCO 53 is also supplied to the phase comparator 52 through the 1/392-frequency divider 54. The switching circuits 46 and 47 are connected to the respective terminals V when the disc 34 being played is the disc 22. Thus, in this state, the switching circuit 47 selectively produces the signal which is applied to the terminal V thereof. In other words, the switching circuit 47 selectively produces the output signal of the frequency divider 51 having the frequency of 15.734 kHz, and this output signal of the switching circuit 47 is supplied to a switching circuit 55 within the player part 35 as an external motor rotation synchronizing signal, through the pin terminals $44_7$ and $43_7$. At the same time, the switching circuit 46 selectively produces the output signal of the VCO 53 having the frequency of 6.1678 MHz, and this output signal of the switching circuit 46 is supplied to the digital signal demodulating circuit 56 as a master clock signal.

The switching circuit 55 is designed to selectively produce the signal having the horizontal scanning frequency $f_H$ when this signal is applied to the pin terminal $43_7$, and to selectively produce the output signal of an oscillator 57 having the horizontal scanning frequency fH when the above signal is not applied to the pin terminal $43_7$. The motor rotation synchronizing signal from the switching circuit 55 having the horizontal scanning frequency, is frequency-divided by 1/21 in a frequency divider 58, and an output signal of this frequency divider 58 is supplied to a comparator 59 wherein the phase of the signal is compared with the phase of an output pulse of a magnetic detector 62.

A rotary shaft 60 of the motor 38 is fixed with a gear wheel 61. The gear wheel 61 comprises 50 teeth, for example, on the outer peripheral surface thereof at equal angular intervals. The magnetic detector 62 is located at a position where the magnetic detector 62 opposes the teeth of the gear wheel 61 over a small distance. As the motor 38 rotates, the turntable 37 rotates unitarily with the motor 38. Hence, the disc 34 which is placed on the turntable 37 and the gear wheel 61 respectively rotate. Every time one tooth of the gear wheel 61 passes by the magnetic detector 62, one pulse is produced from the magnetic detector 62 and supplied to the comparator 59.

When the disc 34 being played is the disc 22, four fields of the NTSC system color video signal are prerecorded on the analog recorded track in one revolution of the disc 34. Hence, 1050 scanning lines are recorded in one revolution of the disc 34 in this case, and 21 scanning lines are reproduced from the disc 34 every time one pulse is produced from the magnetic detector 62. For this reason, the frequency divider 58 frequency-divides the horizontal scanning frequency of 15.734 kHz by 1/21, and the frequency divided signal from the frequency divider 58 is supplied to the comparator 59 together with the output pulse of the magnetic detector 62. The comparator 59 produces an error voltage which is in accordance with the phase error, and supplies this error voltage to the motor 38 through a motor driving amplifier 63. As a result, the motor 38 is controlled so that the horizontal synchronizing signal is reproduced from the disc 34 at the same frequency as the motor rotation synchronizing signal from the frequency divider 58 having the frequency of 15.734 kHz, and the disc 34 and the motor 38 are rotated at a rotational speed of 899.1 rpm.

When the operator pushes a start switch of the input device 39 after the motor 38, the turntable 37, and the disc 34 have started to rotate, a signal which causes a feed mechanism 64 to move in the inner peripheral direction of the disc 34 is produced through the command processor 40 and the microprocessor 41. A reproducing stylus 65 which is fed by the feed mechanism 64, thereafter makes sliding contact with disc 34. The disc 34 has an electrode function, and an electrode is formed on the reproducing stylus 65. Thus, an electrostatic capacitance is formed between the disc 34 and the electrode of the reproducing stylus 65, and this electrostatic capacitance varies according to variations in the geometrical configuration of the recorded tracks. The variations in the electrostatic capacitance is picked up and converted into an electrical signal according to a known method in a pickup circuit 66.

The reproduced signal (RF signal) obtained from the pickup circuit 66, is supplied to a known tracking servo circuit 67. The tracking servo circuit 67 discriminated and separated the reference signals fp1 and fp2, detects the envelopes of the reference signals fp1 and fp2, and differentially amplifies the detected envelopes so as to produce a tracking error signal. The tracking error signal is applied to a tracking coil 68 which controls the reproducing stylus 65 so that the reproducing stylus 65 constantly scans over the recorded track without tracking error. As a result, the stylus tip of the reproducing stylus 65 is minutely displaced in the width direction of the track, instant by instant, depending on the tracking error.

The reproduced signal from the pickup circuit 66 is supplied to an information signal reproducing circuit 69. The reproducing circuit 69 frequency-demodulates the second FM signal which is reproduced from the analog recorded tracks, so as to obtain the composite video signal which is in conformance with the NTSC system and the audio signals. The reproduced composite video signal is produced through an output terminal 70, and the two channels of reproduced audio signals are produced through output terminals 71a and 71b.

Further, the reproduced signal from the pickup circuit 66 is supplied to a demodulator 72 within the adapter part 36, through the pin terminals $43_2$ and $44_2$. The demodulator 72 frequency-demodulates the reproduced signal, and supplies a demodulated signal to a vertical synchronizing signal detecting circuit 73, an address data write-in circuit 74, and the digital signal demodulating circuit 56. As described before, the master clock signal obtained from the switching circuit 46 and having the frequency of 6.1678 MHz, is supplied to the digital signal demodulating circuit 56, and the digital signal demodulating circuit 56 detects the existence of an error by use of the error detecting code CRC within the demodulated digital signal which is reproduced from the digital recorded tracks and has the signal format shown in FIG. 2. When it is detected that the error does exist within the demodulated digital signal, the digital signal demodulating circuit 56 corrects the error by use of the error correcting codes P and Q. Further, the digital signal demodulating circuit 56 supplies the digital audio signals which are transmitted in the positions Ch-1 through Ch-4 shown in FIG. 2, to a digital-to-analog (D-A) converter and switching device 75. On the other hand, in the case where the digital video signal is transmitted in at least one of the positions Ch-1 through Ch-4 shown in FIG. 2, the digital signal demodulating circuit 56 supplies the digital video signal to the still picture decoder 76. The D-A converter and switching device 75 subjects the digital information signals such as the digital audio signals to a digital-to-analog conversion, and is switched and controlled in response to an output of the address data write-in circuit 77. The output of the D-A converter and switching device 75 is produced through an output terminal 80.

The still picture decoder 76 produces an analog video signal of the desired standard television system, related to the original still picture, from the digital video signal which is supplied thereto. This analog video signal from the still picture decoder 76 is produced through an output terminal 78. When two channels of digital video signals relate to two still pictures, the still picture decoder 76 selectively demodulates the still picture of one arbitrary channel, responsive to the control signal from the status decoding circuit 45. The address data write-in circuit 77 writes therein the address data of the address signal having the signal format shown in FIG. 3, by storing the 1-bit control signal which is located at the position Adr shown in FIG. 2 and is obtained from each block. The address data written in the address data write-in circuit 77, is supplied to a terminal D of a switching circuit 79, and to the D-A converter and switching device 75. The D-A converter and switching device 75 produces a switching signal based on the address data from the address data write-in circuit 77, and passes only the audio signals through two or more output terminals among output terminals 80 through 83. In other words, when a 4-channel audio signal is reproduced from the disc 34, the audio signals of the four channels are produced through all of the output terminals 80 through 83. When a 3-channel audio signal is reproduced from the disc 34, the audio signals of the three channels are produced through the output terminals 80 through 82. Further, when two kinds of 2-channel audio signals are reproduced from the disc 34, the audio signals of the two channels in one selected kind of 2-channel audio signal are produced through the output terminals 80 and 81 (or 82 and 83).

The address data write-in circuit 74 discriminates and separates the address signal within the signal which is reproduced from the analog recorded tracks, and writes therein the address data of the separated address signal. The written address data is applied to a terminal AN of the switching circuit 79. The vertical synchronizing signal detection signal from the vertical synchronizing signal detecting circuit 73, and the detection signal from the digital signal demodulating circuit 56 indicating the error detection result by the use of the error detecting code CRC, are respectively supplied to a discriminating circuit 84. In a duration in which the vertical synchronizing signal detection signal is not supplied to the discriminating circuit 84 and the detection signal supplied to the discriminating circuit 84 from the digital signal demodulating circuit 56 indicates that there is no error, the discriminating circuit 84 discriminates that the digital recorded track is being reproduced and connects the switching circuit 79 to the terminal D. On the other hand, in a duration in which the vertical synchronizing signal detection signal is supplied to the discriminating circuit 84 and the detection signal supplied to the discriminating circuit 84 from the digital signal demodulating circuit 56 indicates that there is an error, the discriminating circuit 84 discriminates that the analog recorded track is being reproduced and connects the switching circuit 79 to the terminal AN.

Accordingly, the output address data of the address data write-in circuit 74 is obtained from the switching circuit 79 while the analog recorded track is being reproduced. On the other hand, the output address data of the address data write-in circuit 77 is obtained from the switching circuit 79 while the digital recorded track is being reproduced. The reproduced address data obtained from the switching circuit 79, is supplied to the command processor 40 and the microprocessor 41 within the player part 35, through the pin terminals $44_1$ and $43_1$. The command processor 40 constantly displays the position of the reproducing stylus 65 with the address data which is designated. The microprocessor 41 produces various kinds of signals based on the signals from the input device 39 and the input address data, and supplies the various kinds of signals to the feed mechanism 64.

The digital signal demodulating circuit 56 stores the reproduced digital signals from the demodulator 72 into a buffer memory (not shown) within the digital signal demodulating circuit 56, and reads out the stored digital signals from the buffer memory under control so that the digital signals are re-arranged back to the original sequence (de-interleaved). The reproduced digital data read out from the buffer memory can be restored into the correct digital data when an error exists, according to a known method which uses the error correcting codes arranged at the positions P and Q shown in FIG. 2. Hence, the reproduced digital data read out from the buffer memory contains virtually no error. On the other hand, when a dropout occurs for a long time period, for example, the error correction cannot be performed by use of the above error correcting codes. However, the error rate of the important data is extremely low according to the present embodiment, since the information signal data is repeatedly transmitted an arbitrary number of times according to the tolerance of the data error rate for the particular information content of the information signal data.

In addition, the 24-bit error detecting code which is arranged at the position 26 and transmitted as shown in FIG. 8(C), is provided in each sector. Hence, when an error in a data is detected by use of this error detecting code, this data may be discarded or replaced by a previous data by use of a holding means, so as to keep the undesirable effects of the data error to a minimum. The digital data (data reproduced from the sectors) which are reproduced within the digital signal demodulating circuit 56 with virtually no data error, are supplied to a switching circuit 100 shown in FIG. 11 within the digital signal demodulating circuit 56, through one or more input terminals among input terminals 95 through 98 within the digital signal demodulating circuit 56. FIG. 11 shows an essential part of the digital signal demodulating circuit 56 shown in FIG. 10. The digital video or audio signals which are reproduced in the digital signal demodulating circuit 56, are applied to the remaining input terminals among the input terminals 95 through 98 within the digital signal demodulating circuit 56.

Among the four channels of reproduced data applied to the input terminals 95 through 98, the switching circuit 100 selectively produces the reproduced data of a desired channel, responsive to a mode setting signal which is applied to an input terminal 86 from the personal computer 85 shown in FIG. 10. The reproduced data which is selectively produced from the switching circuit 100, is serially supplied to a 196-bit shift register 101 and to an error detecting circuit 102. The number of bits in the shift register 101 is the same as the number of bits in one sector, and the shift register 101 successively performs a shifting operation responsive to a clock signal which is applied to an input terminal 99. The clock signal applied to the input terminal 99 is obtained by frequency-dividing the master clock signal described before, and has a frequency of 44.056 kHz, for example. The error detecting circuit 102 detects the existence of an error in the reproduced sector, based on the error detecting code CRC which is transmitted at the position 26 in the sector shown in FIG. 8(C). The error detecting circuit 102 supplies a high-level signal, for example, to a NAND circuit 107, only when 196 bits of one sector is stored into the shift register 101 and no error is detected in this one sector. In this state, a high-level detection signal is supplied to the NAND circuit 107 from a synchronizing signal detecting circuit 103.

The frame number, the relative sector number, and the absolute sector number which are set in the personal computer 85 by the operator, are respectively supplied through an input terminal 87 as external signals to a frame number detecting circuit 104, a relative sector number detecting circuit 105, and an absolute sector number detecting circuit 106. The detecting circuits 104 through 106 respectively compare the external signals applied thereto with the values of the signals located at the respective positions 28, 29, and 30 in FIG. 8(D) of the sector which is stored in the shift register 101. The detecting circuits 104 through 106 each supply a high-level detection signal to the NAND circuit 107 only when the values of the two signals compared therein coincide. Accordingly, the five signals supplied to the NAND circuit 107 all assume a high level and a low-level signal is produced from the NAND circuit 107, when the reproduced sector containing the information signal data of the desired channel set by the operator is stored into the shift register in its entirety and no error exists in this reproduced sector. The low-level signal from the NAND circuit 107 is applied to a latch circuit 108 as a latch pulse. The latch circuit 108 latches the 16×8 bits of data, the 5 bits of frame number, 4 bits of relative sector number, and the 4 bits of absolute sector number which are obtained in parallel from the shift register 101, responsive to the latch pulse. The latch circuit 108 transmits serially the latched data to the personal computer 85 through an output terminal 88, every time a shift clock signal is applied to an input terminal 89 from the personal computer 85. Hence, the personal computer 85 performs a predetermined operation based on the serially transmitted data from the latch circuit 108.

Since the sector has a fixed length, the synchronizing signal located at the position SYNC shown in FIG. 8(C) is reproduced periodically. For this reason, it is possible to transmit a data having the same pattern as the synchronizing signal, although the transmission of such a data is impossible in the case where the data being transmitted has a variable length. Moreover, compared to the transmitting system which transmits data of variable length, it is possible to demodulate the digital data within the sectors by use of a circuit having a simple circuit construction.

When searching for a desired track position from among the digital recording tracks which are recorded with the information signal data, it is possible to make such a search by designating the track number address signal which has the signal format shown in FIG. 3 and indicates the number of tracks, and the frame number and the relative sector number shown in FIG. 8(D), for example. In a case where the search cannot be made by such designation, the absolute sector number is designated instead of the relative sector number.

The present invention is not limited to the embodiments described heretofore, and the present invention may be applied to a disc of another type, for example. This other type of disc may have analog recording tracks recorded with a composite video signal having a field frequency of 50 Hz and 625 scanning lines, and digital recording tracks recorded with 3528 ($=44.100 \times 10^3 \times (4/50)$) blocks of signals in one revolution of the other type of disc, the digital signals having the signal format shown in FIG. 2 are time-sequentially recorded on the disc with a transmission frequency of 44.100 kHz, and the reproduction is carried out by rotating the disc at a rotational speed of 750 rpm which is the same as the rotational speed of the video disc described before. In one digital recording track on this other type of disc, the information signal data is divided into 18 frames and recorded with respect to one channel, where each frame comprises 3136 bits and is made up of 16 sectors each having 196 bits. In other words, the number of sectors within one frame is also 16 for this other type of disc, as in the case of the disc described previously. Further, the number of bits in each sector and the signal format, are also the same as those of the disc described previously.

The transmitting system according to the present invention was described with reference to the case where the present invention is applied to the disc on which the analog recording tracks and the digital recording tracks coexist. However, the application of the present invention is not limited to the application described heretofore. For example, the present invention may be applied to a disc only having the digital recording tracks on the same recording surface thereof. In addition, the present invention may be applied to an optical type disc. The optical type disc is the type of disc from which the pre-recorded signals are reproduced by impinging a light beam onto the disc and detecting variations in the intensity of light reflected by or transmitted through the disc. Moreover, the number of fields recorded in one revolution of the disc may be two.

Further, the present invention is not limited to these embodiments, but various variations and modifications may be made without departing from the scope of the present invention.

What is claimed is:

1. A digital data transmitting system for transmitting a plurality of channels of digital data through a transmitting medium such as a recording medium, said plurality of channels of digital data being obtained by subjecting information signals to a digital modulation, said information signals comprising a non-compressed audio signal, a video signal, and an information signal other than the non-compressed audio signal and the video signal, said digital data transmitting system comprising:

first means for transmitting a channel of digital information signal data which are obtained by subjecting said information signal to the digital modulation, said digital information signal data being divided into sectors each having k words, where k is a natural number, and being transmitted within a predetermined transmission time period so that a sector is transmitted once or repeatedly a number of times depending on an information content of the sector; and second means for adding a first code and a first synchronizing signal to each sector of said digital information signal data which are obtained from said first means, and for transmitting the digital information signal data which have the sectors added with said first code and said first synchronizing signal, said first code assuming the same value for sectors which are repeatedly transmitted within said predetermined transmission time period, each of said sectors being transmitted with a signal format in which a mode code indicative of a kind of the information content of the sector, a first error detecting code, and a second code indicative of a sequence of the sector within said predetermined transmission time period, are time-sequentially transmitted together with said first code and said first synchronizing signal which are obtained from said second means, said mode code being made up of a first mode code indicative of the kind of the information content of the sector when upper and lower parts of each word of the sector are of the same kind, and a second mode code indicative of a combination of the different kinks when the upper and lower parts of each word of the sector are of different kinds.

2. A transmitting system as claimed in claim 1 in which said digital information signal data are recorded on an information signal recording disc, and said predetermined transmission time period is 1/n times a transmission time period in which signals recorded in one track turn of said information signal recording disc are transmitted, where n is a natural number.

3. A transmitting system as claimed in claim 1 which further comprises recording means for time-sequentially recording digital signals on an information signal recording disc in terms of blocks at a rate of a plurality of blocks per track turn of said information signal recording disc, each of said blocks being constituted by said plurality of channels of digital data having a second synchronizing signal a second error detecting code, error correcting codes, and an address signal added thereto, and said digital information signal data are divided into N sectors and transmitted for one track turn of said information signal recording disc with respect to one channel, where N is a natural number greater than or equal to two.

4. A transmitting system as claimed in claim 3 in which said digital information signal data are divided into M frames for one track turn of said information signal recording disc with respect to one channel, where M is such a natural number greater than or equal to two that the natural number N is a multiple of the natural number M, and each of said frames are made up of N/M sectors.

5. A transmitting system as claimed in claim 4 in which N sectors which are transmitted in one track turn of said information signal recording disc, are transmitted after said N sectors are interleaved.

* * * * *